US009596061B2

(12) United States Patent
Wallén et al.

(10) Patent No.: US 9,596,061 B2
(45) Date of Patent: Mar. 14, 2017

(54) REFERENCE SIGNAL COUPLING IN A WIRELESS NETWORK

(71) Applicant: Telefonaktiebolaget L M Ericsson (publ), Stockholm (SE)

(72) Inventors: Anders Wallén, Ystad (SE); Johan Bergman, Stockholm (SE); Erik Eriksson, Linköping (SE); Mattias Frenne, Uppsala (SE); Fredrik Nordström, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/431,922

(22) PCT Filed: Jan. 27, 2015

(86) PCT No.: PCT/SE2015/050080
§ 371 (c)(1),
(2) Date: Mar. 27, 2015

(87) PCT Pub. No.: WO2015/119559
PCT Pub. Date: Aug. 13, 2015

(65) Prior Publication Data

US 2015/0358132 A1 Dec. 10, 2015

Related U.S. Application Data

(60) Provisional application No. 61/937,932, filed on Feb. 10, 2014.

(51) Int. Cl.
*H04L 5/00* (2006.01)
*H04W 72/04* (2009.01)

(52) U.S. Cl.
CPC .......... *H04L 5/0023* (2013.01); *H04L 5/0048* (2013.01); *H04W 72/0446* (2013.01)

(58) Field of Classification Search
CPC . H04L 4/0023; H04L 4/0048; H04W 72/0446
(Continued)

(56) References Cited

U.S. PATENT DOCUMENTS

2011/0080965 A1* 4/2011 Liu .................... H04L 25/0224 375/260
2011/0228735 A1* 9/2011 Lee ...................... H04L 5/0051 370/329
(Continued)

FOREIGN PATENT DOCUMENTS

WO WO 2013/141801 A1 9/2013

OTHER PUBLICATIONS

PCT Written Opinion of the International Searching Authority for International application No. PCT/SE2015/050080, Apr. 7, 2015.
(Continued)

*Primary Examiner* — Stephen J Clawson
(74) *Attorney, Agent, or Firm* — Baker Botts, LLP

(57) ABSTRACT

According to some embodiments, a method of coupling reference signals of a wireless network comprises establishing a wireless connection with a wireless device. The wireless connection comprises a first reference signal and a second reference signal and both the first and second reference signals are associated with one or more antenna ports. The method further comprises determining a mapping between the one or more antenna ports associated with the first reference signal and the one or more antenna ports associated with the second reference signal; communicating the mapping of antenna ports to the wireless device; and transmitting the first reference signal and the second reference signal to the wireless device according to the communicated mapping.

16 Claims, 5 Drawing Sheets

600
608 establish wireless connection with a radio network node, the wireless connection comprising first and second reference signals
610 receive signaling related to antenna port mapping
612 DMRS Mapped to CRS?
No / Yes
614 perform channel estimation based on DMRS only
616 perform channel estimation based on DMRS and CRS
618 demodulate data transmitted over the wireless connection based on the channel estimation

(58) Field of Classification Search
USPC .......................................................... 370/329
See application file for complete search history.

(56) References Cited

U.S. PATENT DOCUMENTS

2011/0256897 A1* 10/2011 Taoka .................. H04B 7/0615 455/509
2013/0044701 A1 2/2013 Koorapaty et al.
2013/0301542 A1 11/2013 Krishnamurthy et al.
2014/0314041 A1* 10/2014 Kim ...................... H04L 5/0048 370/329

OTHER PUBLICATIONS

3GPP™ Work Item Description—Title: Low cost & enhanced MTC UE for LTE-Core Part, RF-130848, 7 pages, Jun. 10-14, 2013.
3GPP198 Work Item Description—Title: Low cost & enhanced MTC UE for LTE-Feature Part, RF-130848, 5 pages, Jun. 10-14, 2013.
3GPP™ Work Item Description—Title: Low cost & enhanced MT CUE for LTE-Performance Part, RF-130848, 5 pages, Jun. 10-14, 2013.

* cited by examiner

CRS Antenna Port 0

CRS Antenna Port 1

DMRS Antenna Port 7

DMRS Antenna Port 8

DMRS Antenna Port 9

DMRS Antenna Port 10

REFERENCE SIGNAL COUPLING IN A WIRELESS NETWORK

PRIORITY

This nonprovisional application is a U.S. National Stage Filing under 35 U.S.C. §371 of International Patent Application Serial No. PCT/SE2015/050080, filed Jan. 27, 2015, and entitled "REFERENCE SIGNAL COUPLING IN A WIRELESS NETWORK" which claims priority to U.S. Provisional Patent Application No. 61/937,932 filed Feb. 10, 2014, both of which are hereby incorporated by reference in their entirety.

TECHNICAL FIELD

Particular embodiments relate generally to reference signals in wireless communications networks, and more particularly to coupling reference signals in wireless communications networks.

BACKGROUND

In a wireless network, a wireless device may communicate with one or more radio network nodes to transmit and receive voice traffic, data traffic, control signals, and so on. Reference signals, or pilot signals, may be transmitted in communication systems to provide a phase reference that a receiver can use to synchronize timing of a transmission and adjust for frequency error between a transmitter and receiver. Reference signals may also provide a phase reference such that a receiver can estimate a propagation channel between a transmitter and the receiver to demodulate and decode a transmitted data message.

In cellular systems, reference signals transmitted in a cell from a base station to user equipment (UE) may be referred to as common or dedicated reference signals. Common, or cell-specific, reference signals (CRS) may be used by all UEs communicating with the cell and are typically broadcast with equal power in all directions within the cell. Dedicated, or user-specific, reference signals are typically received and used by a single user.

Machine-to-machine (M2M) communication (also referred to as machine type communication (MTC)) establishes communication between machines and/or between machines and humans. The communications may comprise exchange of data, signaling, measurement data, configuration information, etc. The device size may vary from that of a wallet to that of a base station. M2M devices are often used for applications like sensing environmental conditions (e.g., temperature reading, etc.), metering or measurement (e.g., electricity usage, etc.), fault finding or error detection, etc.

Generally MTC devices are low cost and low complexity. A low complexity UE that may be used for M2M operation may implement one or more low cost features, such as smaller downlink and uplink maximum transport block size (e.g., 1000 bits) and/or reduced downlink channel bandwidth of 1.4 MHz for data channel (e.g., PDSCH). A low cost UE may also comprise of a half-duplex (HD-FDD) and one or more of the following additional features: single receiver (1 Rx) at the UE, smaller downlink and/or uplink maximum transport block size (e.g., 1000 bits), and reduced downlink channel bandwidth of 1.4 MHz for data channel. The low cost UE may also be referred to as a low complexity UE.

Path loss between an M2M device and a base station can be large in some scenarios. For example, path loss may be large for an M2M device in a remote location (such as an M2M sensor or metering device located in the basement of a building). In such scenarios receiving a signal, including reference signals, from the base station may be challenging. For example, the path loss can be 20 dB worse than normal operation. Enhanced coverage in uplink and downlink may alleviate such challenges. Examples of techniques in the UE and/or in the radio network node for enhancing the coverage include transmit power boosting, repetition of transmitted signal, applying additional redundancy to the transmitted signal, use of advanced/enhanced receiver, etc. In general, when employing coverage enhancing techniques, the M2M may be referred to as operating in "coverage enhancing mode." A low complexity UE (e.g., UE with one receiver) may also be capable of supporting enhanced coverage mode of operation.

SUMMARY

According to some embodiments, a method of coupling reference signals of a wireless network comprises establishing a wireless connection with a wireless device. The wireless connection comprises a first reference signal and a second reference signal and both the first and second reference signals are associated with one or more antenna ports. The method further comprises determining a mapping between the one or more antenna ports associated with the first reference signal and the one or more antenna ports associated with the second reference signal; communicating the mapping of antenna ports to the wireless device; and transmitting the first reference signal and the second reference signal to the wireless device according to the communicated mapping.

In particular embodiments, the mapping of antenna ports comprises a precoding weight associated with each of the antenna ports associated with the first reference signal.

According to some embodiments, a method of coupling reference signals of a wireless network comprises establishing a wireless connection with a radio network node. The wireless connection comprises a first reference signal and a second reference signal and both the first and second reference signals are associated with one or more antenna ports. The method further comprises receiving a mapping between the one or more antenna ports associated with the first reference signal and the one or more antenna ports associated with the second reference signal; performing channel estimation based at least on the first reference signal, the second reference signal, and the received mapping of antenna ports; and demodulating data transmitted over wireless connection based on the channel estimation.

In particular embodiments, performing channel estimation comprises estimating an amplitude component of the channel based on the first reference signal and estimating a phase component of the channel based on both the first reference signal and the second reference signal.

In particular embodiments, the mapping of antenna ports comprises a precoding weight associated with each of the antenna ports associated with the first reference signal.

According to some embodiments, a network node for coupling reference signals of a wireless network comprises a processor operable to establish a wireless connection with a wireless device. The wireless connection comprises a first reference signal and a second reference signal and both the first and second reference signals are associated with one or more antenna ports. The processor is further operable to determine a mapping between the one or more antenna ports associated with the first reference signal and the one or more antenna ports associated with the second reference signal; communicate the mapping of antenna ports to the wireless device; and transmit the first reference signal and the second reference signal to the wireless device according to the communicated mapping.

According to some embodiments, a wireless device for coupling reference signals of a wireless network comprises a processor operable to establish a wireless connection with a radio network node. The wireless connection comprises a first reference signal and a second reference signal and both the first and second reference signals are associated with one or more antenna ports. The wireless device also comprises an interface operable to receive a mapping between the one or more antenna ports associated with the first reference signal and the one or more antenna ports associated with the second reference signal. The processor is further operable to perform channel estimation based at least on one of the first reference signal, the second reference signal, and the received mapping of antenna ports. The processor is further operable to demodulate data transmitted over wireless connection based on the channel estimation.

Particular embodiments may exhibit some of the following technical advantages. Particular embodiments may mitigate loss resulting from bad channel estimation quality during operation in low signal to noise ratio (SNR) conditions by increasing the reference signal power available for performing channels estimation in a wireless device. Particular embodiments may improve channel estimation quality for a first reference signal by using power allocated to a second reference signal. For example, some advantages may be realized by a network node explicitly or implicitly informing a wireless device that the first and second reference signals are related to each other and that channel estimation may be based on both reference signals. A wireless device may use the known relationship between the first and second reference signal to perform improved channel estimation by using the combined reference signals. Particular embodiments provide flexibility for selecting between improved robust channel estimates and versatile adaptation of multi-antenna transmission parameters.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

In particular networks, a UE might receive reference signals at a low signal to noise ratio (SNR). Demodulation results can be sensitive to channel estimation quality when operating in low SNR regions. Channel estimates at low SNR values may become noisy which may impact demodulation performance. One reason for poor channel estimation quality is that power allocated to the reference signals may not be high enough under these low SNR conditions. Channel estimation quality for some reference signals may be improved by boosting the pilot signal power. Increasing pilot signal power, however, may lower the power available for data symbols. A UE may also use averaging (or low-pass filtering) of channel estimates over several consecutive subframes. This may be advantageous when reference symbols are not multiplied by weights that vary between subframes and when UEs are nearly stationary such that the propagation channel does not change significantly for several subframes.

To improve beamforming and/or diversity gain, an eNodeB may apply a (time-varying) precoder to its multiple antenna ports before transmitting data and/or dedicated reference signals. When operating in enhanced coverage mode, the eNodeB may realize particular advantages if the eNodeB does not change the precoder used for different reference signals. For example, not changing the precoder used for different reference signals may enable channel estimates to be low-pass filtered between subframes. Such filtering may alleviate performance loss due to bad channel estimation quality. Fewer resources, however, are still allocated to some reference signals compared to others.

An object of the present disclosure is to obviate at least these disadvantages and provide an improved method to perform successful channel estimation in low SINR environments. Particular embodiments described below may improve channel estimation quality for a first reference signal by using power allocated to a second reference signal. For example, some advantages may be realized by explicitly or implicitly informing a UE that the first and second reference signals are related to each other and that channel estimation may be based on both reference signals.

Particular embodiments are described with reference to FIGS. 1-8 of the drawings, like numerals being used for like and corresponding parts of the various drawings. LTE is used throughout this disclosure as an example wireless system, but the ideas presented herein apply to other wireless communication systems as well.

Figure 1:
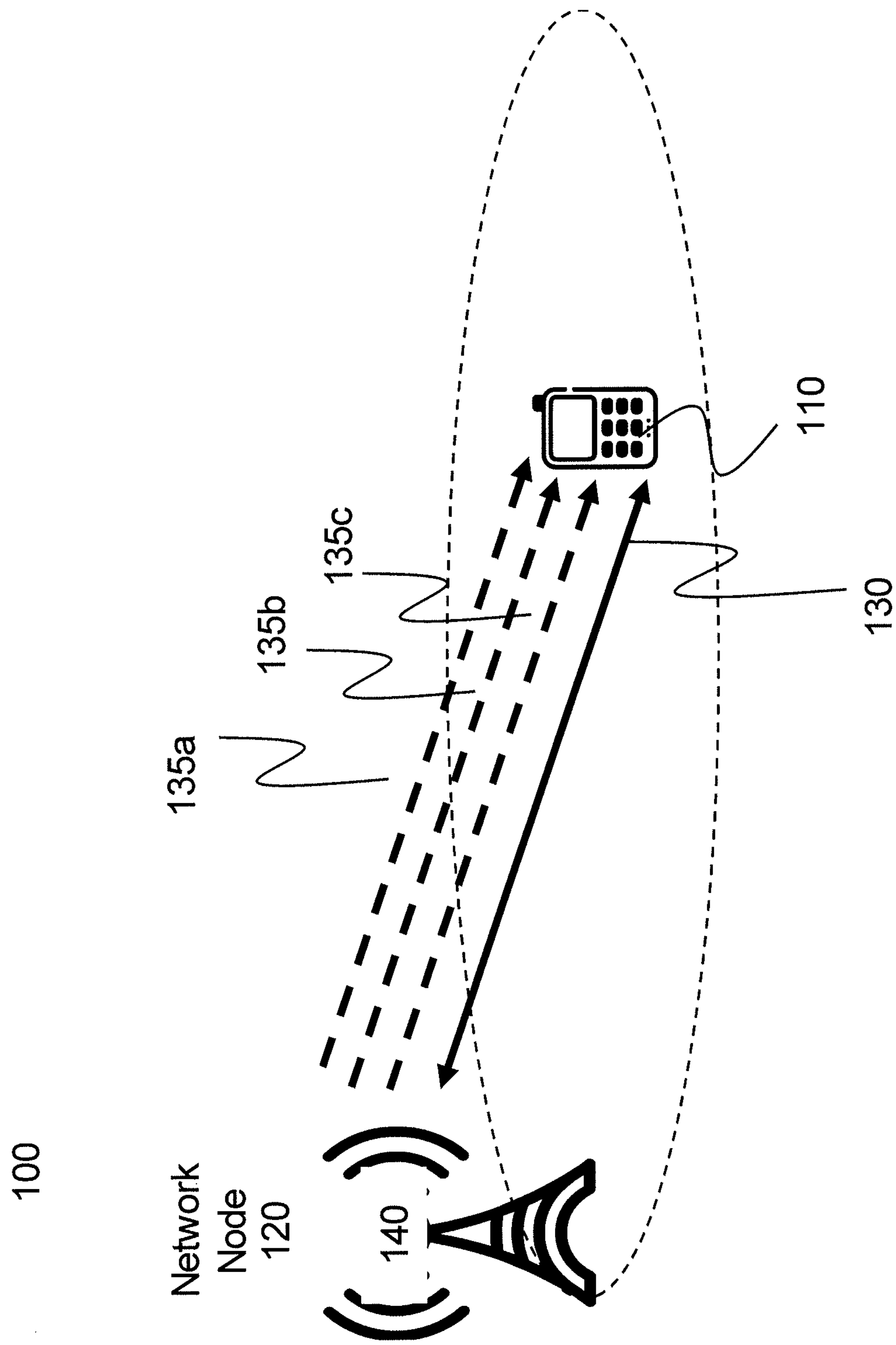
FIG. 1 is a block diagram illustrating an example of a wireless network, according to some embodiments.

FIG. 1 is a block diagram illustrating an example of a wireless network, according to some embodiments. Network 100 includes radio network node 120 (such as a base station or eNodeB) and wireless devices 110 (such as mobile phones, smart phones, laptop computers, tablet computers, MTC devices, or any other devices that can provide wireless communication). In general, wireless devices 110 that are within coverage of radio network node 120 communicate with radio network node 120 by transmitting and receiving wireless signals 130. For example, wireless devices 110 and radio network node 120 may communicate wireless signals 130 containing voice traffic, data traffic, reference signals, and/or control signals. Wireless signals 130 may include both downlink transmissions (from radio network node 120 to wireless devices 110) and uplink transmissions (from wireless devices 110 to radio network node 120). Wireless signals 130 may include reference signals 135. Wireless device 110 may detect reference signals 135 to perform channel estimation and data demodulation. Wireless signals 130 comprise radio frames, such as the example radio frame illustrated in FIG. 3 described below.

Radio network node 120 transmits and receives wireless signals 130 using antenna 140. In particular embodiments, radio network node 120 may comprise multiple antennas 140. For example, radio network node 120 may comprise a multi-input multi-output (MIMO) system with two, four, eight, or any suitable number of antennas 140.

In network 100, each radio network node 120 may use any suitable radio access technology, such as long term evolution (LTE), LTE-Advanced, UMTS, HSPA, GSM, cdma2000, WiMax, WiFi, and/or other suitable radio access technology. Network 100 may include any suitable combination of one or more radio access technologies. For purposes of example, various embodiments may be described within the context of certain radio access technologies. However, the scope of the disclosure is not limited to the examples and other embodiments could use different radio access technologies.

As described above, embodiments of a network may include one or more wireless devices and one or more different types of radio network nodes capable of communicating with the wireless devices. The network may also include any additional elements suitable to support communication between wireless devices or between a wireless device and another communication device (such as a landline telephone). A wireless device may include any suitable combination of hardware and/or software. For example, in particular embodiments, a wireless device, such as wireless device 110, may include the components described with respect to FIG. 7 below. Similarly, a radio network node may include any suitable combination of hardware and/or software. For example, in particular embodiments, a radio network node, such as radio network node 120, may include the components described with respect to FIG. 8 below.

In some embodiments, reference signal 135*a* may comprise a cell-specific reference signal (CRS). CRS 135 may be transmitted in all or almost all subframes and may be used to support channel estimation to demodulate different physical control and data channels. CRS 135*a* may also be used for measuring signal strength and quality within its own cell and neighboring cells.

In some embodiments, target signal 135*b* may comprise a dedicated reference signal such as a demodulation reference signal (DMRS or DM-RS). For example, DMRS 135*b* may comprise a demodulation reference signal for the Physical Downlink Shared Channel (PDSCH). As another example, DMRS 135*c* may comprise a demodulation reference signal for the Enhanced Physical Downlink Control Channel (EPDCCH).

Reference signals 135 may be mapped to and transmitted from antenna ports. Antenna ports may represent logical antennas. An antenna port may map to one or more physical antenna. In multi-antenna transmission schemes, such as transmit diversity and Multiple-Input Multiple-Output (MIMO), multiple antenna ports may transmit multiple types of reference signals. In an LTE example, an antenna port may be mapped to a fixed set of resource elements (RE) in the OFDMA physical layer time-frequency grid. An LTE standard may define the reference symbols sent on each one of the REs.

Figure 2:
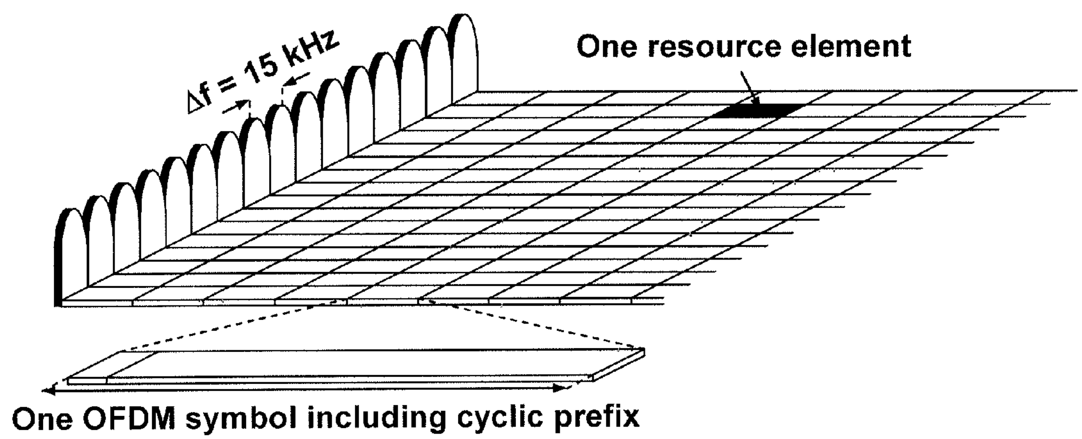
FIG. 2 illustrates an example Orthogonal Frequency-Division Multiplexed (OFDM) symbol.

FIG. 2 illustrates an example OFDM symbol. LTE uses OFDM in the downlink where each downlink symbol may be referred to as an OFDM symbol. Furthermore, LTE uses Discrete Fourier Transform (DFT)-spread OFDM, also referred to as Single-Carrier FDMA (SC-FDMA), in the uplink, where each uplink symbol may be referred to as an SC-FDMA symbol. The basic LTE downlink physical resource may be illustrated as a time-frequency grid as shown in FIG. 2, where each resource element corresponds to one OFDM subcarrier during one OFDM symbol interval. In the time domain, LTE downlink transmissions may be organized into radio frames.

Figure 3:
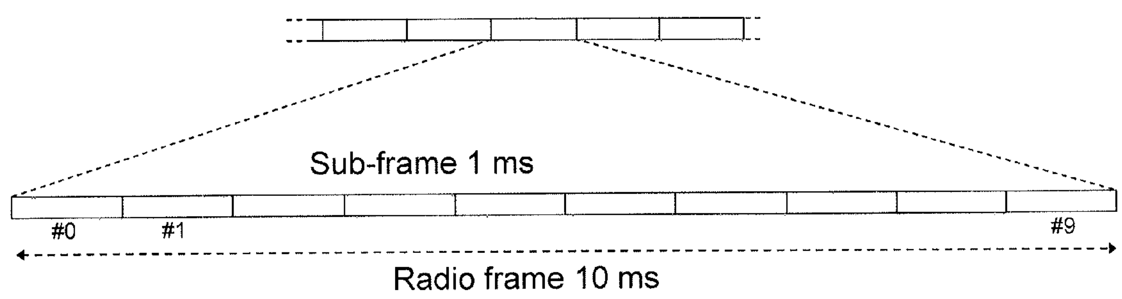
FIG. 3 illustrates an example radio frame.

FIG. 3 illustrates an example radio frame. A radio frame is 10 ms and each radio frame consists of ten 1 ms subframes. Resource allocation in LTE may be described in terms of resource blocks (RBs), where a resource block corresponds to one slot (0.5 ms) in the time domain and twelve contiguous subcarriers in the frequency domain. A pair of two adjacent resource blocks in the time domain (1.0 ms) may be referred to as a resource block pair. Resource blocks may be numbered in the frequency domain, starting with 0 at one end of the system bandwidth. Each slot typically corresponds to seven OFDM symbols for downlink (SC-FDMA symbols for uplink) for normal cyclic prefix and six OFDM symbols for downlink (SC-FDMA symbols for uplink) for extended cyclic prefix.

LTE also includes the concept of virtual resource blocks (VRB) and physical resource blocks (PRB). The actual resource allocation to a UE is made in terms of VRB pairs. Resource allocations may be localized or distributed. Localized resource allocation directly maps a VRB pair to a PRB pair, hence two consecutive and localized VRB are also placed as consecutive PRBs in the frequency domain. Distributed VRBs are not mapped to consecutive PRBs in the frequency domain, which provides frequency diversity for data channels transmitted using distributed VRBs.

Downlink transmissions may be dynamically scheduled (i.e., in each subframe a base station transmits control information about which wireless devices will receive data and upon which resource blocks the data is transmitted). Downlink Control Information (DCI) may be carried by the Physical Downlink Control Channel (PDCCH). This control signaling may be transmitted in the first 1, 2, 3 or 4 OFDM symbols in each subframe, and the number n=1, 2, 3 or 4 may be referred to as the Control Format Indicator (CFI). The downlink subframe may also contain common reference symbols, which are known to the receiver and used for coherent demodulation of, e.g., the control information.

PDSCH may use different data transmission modes. For example, one mode may use a CRS for demodulation. In this mode, the UE may use the CRS symbols, among other things, to estimate a propagation channel from each transmit (TX) antenna port in an eNodeB to each receive (RX) antenna in a UE. In particular embodiments, the CRS may be transmitted on antenna ports $p=0$, $p\in\{0, 1\}$ or $p\in\{0, 1, 2, 3\}$ depending on whether 1, 2, or 4 antenna port transmission is configured.

Figure 4A:
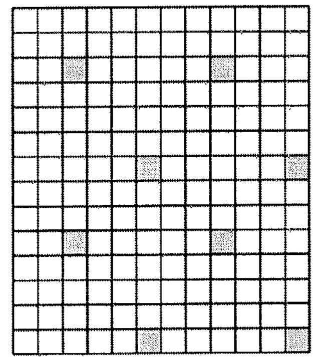
FIG. 4A illustrates an example antenna port mapping for cell specific reference signals.
Figure 4A:
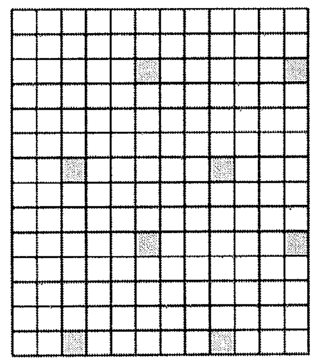

FIG. 4A illustrates an example antenna port mapping for cell specific reference signals. FIG. 4A illustrates two example subframe patterns, each comprising time-frequency resource elements. The shaded time-frequency resource elements represent time-frequency resource elements allocated for transmitting CRS from each antenna port. A first pattern of time-frequency resource elements is allocated to transmit CRS from antenna port 0 and a second pattern of time-frequency resource elements is allocated to transmit CRS from antenna port 1. In LTE, resource elements used for transmitting CRS on any antenna port are not typically used for any transmission on any other antenna port in the same slot.

Figure 4B:
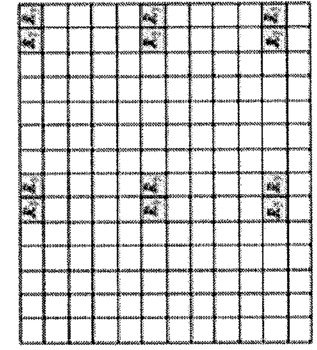
FIG. 4B illustrates an example antenna port mapping for user specific reference signals.
Figure 4B:
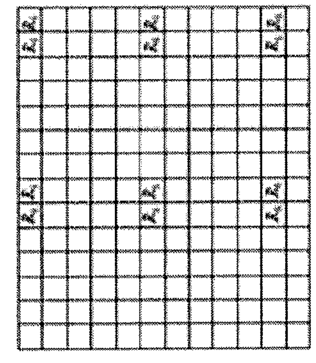
Figure 4B:
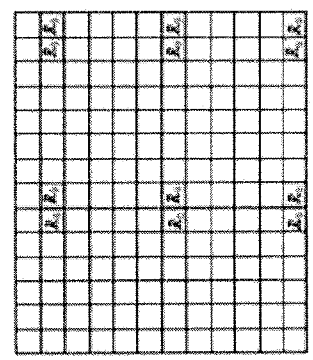
Figure 4B:
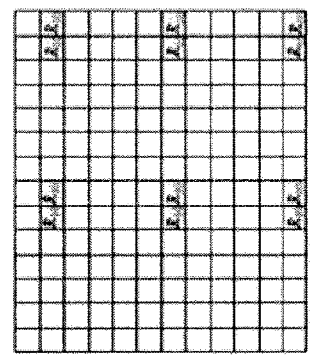

FIG. 4B illustrates an example antenna port mapping for user specific reference signals. FIG. 4B illustrates four example subframe patterns, each comprising time-frequency resource elements. The shaded time-frequency resource elements represent time-frequency resource elements allocated for transmitting DMRS from each antenna port. A first pattern of time-frequency resource elements is allocated to transmit DMRS from antenna ports 7 and 8 and a second pattern of time-frequency resource elements is allocated to transmit DMRS from antenna ports 9 and 10.

As a particular LTE example, antenna port 8, when present, may use the same set of resource elements as antenna port 7, but with different precoding (i.e., they are code division multiplexed). Similarly, antenna ports 9 and 10 (when present) may use a different set of resource elements in a similar manner. If a resource element is used in a slot for DMRS transmission on antenna port 7 or 8, then it is typically not used for any transmission on antenna port 9 or 10, and vice versa.

In particular embodiments, time-frequency resource elements for some reference signals may be statically allocated, such as by a standards specification, and time-frequency resource elements for other reference signals may be dynamically allocated. Dynamic allocation may be based on network conditions or any other suitable criteria.

To optimize signal to noise ratio (SNR) for data transmission in multi-antenna transmission schemes, data symbols may be multiplied with a precoding vector or matrix. For TX diversity, a precoding vector may rotate the phases of signals from the TX antennas such that the signals add constructively at the RX antennas at the UE and may produce a beamforming gain. Similarly, a precoding matrix may attempt to maximize a spatial multiplexing gain for MIMO transmission.

Because CRS symbols are common to all users in a cell, however, the CRS symbols may not be precoded for a specific user. Instead, for example, an eNodeB may signal to a UE a particular precoder used for data transmission to that UE. The UE may use the signaled precoder to undo the precoding when reconstructing the transmitted data symbols. In some embodiments, a UE may inform an eNodeB about the UE's preferred precoder. In some embodiments, the preferred precoder may be selected from a codebook of possible precoders based on measurements related to the propagation channel.

As another example, a data transmission mode may use user-specific reference signals. When using user-specific reference signals, an eNodeB may perform phase rotations to improve beamforming and spatial multiplexing gains both on reference signals and data symbols. In this example, a UE may perform channel estimation and demodulate the data signal without knowing the precoder used by a transmitting eNodeB. An eNodeB may not be restricted to use only the precoders defined in codebooks, and may also change precoders each subframe. An advantage is that transmissions may be adapted to maximize link-level performance. Such an advantage may also be recognized in scenarios with a rapidly changing propagation channel. In some embodiments, an eNodeB may receive measurements from a UE. The eNodeB may use the measurements to determine precoder selections.

In some embodiments, user-specific reference signals may be used with certain transmission modes of the data channel PDSCH, and with the Enhanced physical control channel EPDCCH. The DMRS for PDSCH may be transmitted on antenna ports p=5, p=7, p=8, or one or several of $p \in \{7 \ldots 14\}$. The DMRS for EPDCCH may be transmitted on one or several of $p \in \{107 \ldots 110\}$.

A particular goal of enhanced coverage for MTC UEs is to improve the SNR region in which the MTC UEs may successfully communicate with a radio network node. The targeted improvement may be different for different physical channels. In some cases, the desired improvement may be on the order of 15 dB. Such improvements may be obtained by repetition. For example, a message may be transmitted over several 1 ms subframes instead of a single subframe transmission. EPDCCH may benefit from coverage improvement using repeated transmissions using user-specific reference signals. DMRS may also benefit from using repeated transmissions.

Demodulation results may become sensitive to channel estimation quality when operating in low SNR conditions. Channel estimates at low SNR values may become noisy which may impact demodulation performance. One reason for poor channel estimation quality is that power allocated to the reference signals may not be high enough for these low SNR operating points. Channel estimation quality for CRS based transmissions may be improved by boosting the pilot signal power. Increasing pilot signal power, however, may lower the power available for data symbols.

A UE may also use averaging (or low-pass filtering) of channel estimates over several consecutive subframes. This may be advantageous when CRS symbols are not multiplied by weights that vary between subframes and when UEs requiring operation in an enhanced coverage mode are almost stationary, such that the propagation channel does not change significantly for several subframes. Detrimental effects of deteriorating channel estimates may be more pronounced for DMRS than for CRS, because fewer resource elements per resource block are typically allocated to DMRS reference symbols.

When operating in enhanced coverage mode, an eNodeB may realize particular advantages by not changing the precoder used between the subframes spanning the repetitions of an EPDCCH or PDSCH transmission. This allows for channel estimates to be low-pass filtered between subframes. Such filtering may alleviate performance loss due to bad channel estimation quality. Fewer resources, however, are typically still allocated to DMRS compared to CRS.

Particular embodiments may improve channel estimation quality for DMRS based transmissions, for example, by also using power allocated to CRS symbols. For example, some advantages may be realized by explicitly or implicitly informing a UE that CRS and DMRS symbols are related to each other and that channel estimation may be based both on CRS and DMRS. In some embodiments, an option of using enhanced channel estimation methods may be enabled or disabled by explicit signaling. In some embodiments, the option may be enabled or disabled by implicit rules.

According to some embodiments, advantages include mitigation of loss attributable to poor channel estimation quality resulting from operation in low SNR conditions by increasing reference signal power available for performing channel estimation in a UE. Such embodiments may maintain the flexibility of selecting between improved robust channel estimates and versatile adaptation of multi-antenna transmission parameters.

Some embodiments may define an explicit relationship between antenna ports. One of skill in the art may envision other possible embodiments, some of which are listed below. Some embodiments may be used in combination with each other. CRS and DMRS for EPDCCH are used as examples to describe some embodiments, but others combination of cell-specific and/or user-specific reference signals would be apparent to one of skill in the art. Such embodiments may include combinations of CRS and DMRS for PDSCH, CSI-RS and positioning RS, or MBSFN RS and DMRS for EPDCCH, or any other suitable combination of reference signals.

Figure 5:
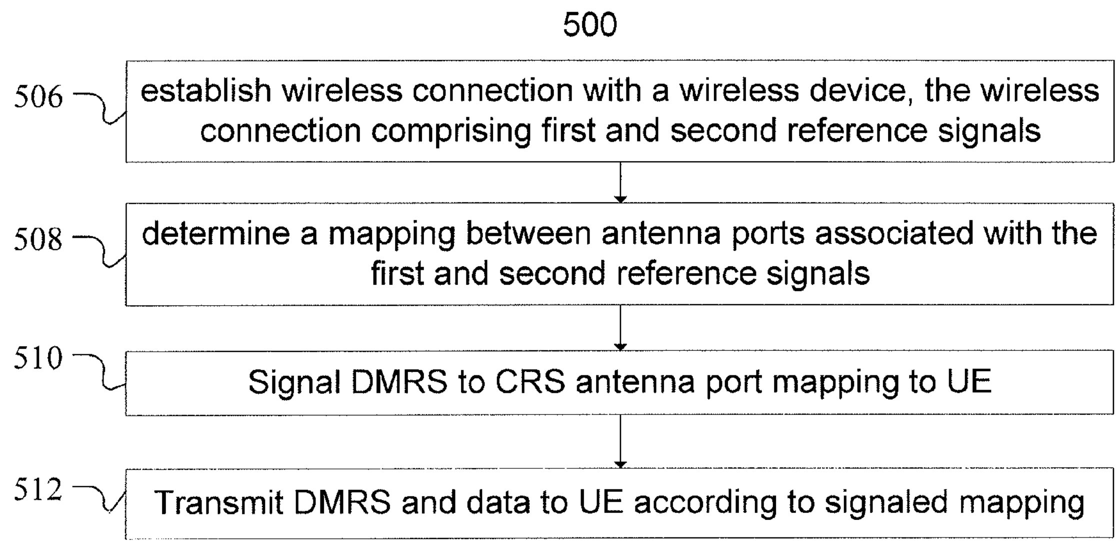
FIG. 5 is a flowchart of an example method of coupling reference signals in a radio network node, according to some embodiments.

FIG. 5 is a flowchart of an example method of coupling reference signals in a radio network node, according to some embodiments. In particular embodiments, one or more steps of method 500 may be performed by components of network 100 described with reference to FIGS. 1-4B and 7-8.

Method 500 begins at step 506, where a radio network node, such as radio network node 120 in FIG. 1, establishes a wireless connection, such as wireless connection 130, with a wireless device, such as wireless device 110. The wireless connection comprises at least two reference signals. As a particular example, wireless device 110 may comprise three reference signals 135*a-c*. Reference signal 135*a* may comprise CRS 135*a* and may be associated with antenna ports p=0 and p=1. Reference signal 135*b* may comprise DMRS 135*b* and may be associated with antenna ports p=7 and p=8.

At step 508, the radio network node determines a mapping between one more antenna ports associated with a first reference signal, such as DMRS 135*b*, and one or more antenna ports associated with a second reference signal, such as CRS 135*a*. For example, in a two-antenna transmission configuration, radio network node 120 may determine that antenna ports p=7 and p=8 associated with DMRS 135*b* for PDCCH map to CRS 135*a* antenna ports p=0 and p=1, respectively.

At step 510, the radio network node communicates the mapping of antenna ports to the wireless device. For example, radio network node 120 communicates the mapping of antenna ports determined in step 508 to wireless device 110. Radio network node 120 may communicate the mapping using signaling messages or any other suitable communication method. Signaling of antenna port mapping and any other associated conditions described below may be performed through any appropriate signaling method. For example, signaling may be accomplished using higher-layer signaling such as RRC signaling. Signaling may be part of physical layer control signaling, such as part of a DCI format. Signaling may be broadcast to all UEs in a cell, or through unicast signaling means.

At step 512, the radio network node transmits the first reference signal and the second reference signal to the wireless device according to the communicated mapping. For example, radio network node 120 may transmit DMRS 135*b* to wireless device 110 on antenna ports p=7 and p=8. Radio network node 120 may transmit CRS 135*a* to wireless device 110 on antenna ports p=0 and p=1.

In some embodiments, a radio network node communicates to a wireless device that a one-to-one mapping exists between a first set of antenna ports and a second set of antenna ports. As an LTE example, in a one-to-one mapping the CRS ports may not be precoded, and the radio network node at subsequent PDSCH or EPDCCH transmissions may not multiply the DMRS symbols with any additional precoding weight. That is, the transmitted DMRS symbols are the ones specified in the standard. Similarly, the radio network node may not apply precoding weights to the PDSCH or EPDCCH symbols.

In some embodiments, the network may signal that a first set of antenna ports are mapped to a second set of antenna ports and that fixed weights may be applied to the first set of antenna ports. The weights may common to all ports, or separate for each port. The weights may be a (complex) number or any other suitable representation of a relationship between two antenna ports. The radio network node may explicitly signal the weights, or the weights may be inferred implicitly (e.g., from a standards document). The weights may be constant over time, or the weights may be time-varying. The weights may be time-varying, but constant over L consecutive subframes, where L≥1. In some embodiments, the weights may cycle through a predetermined pattern known to both the wireless device and the radio network node. In some embodiments, the mapping between the first set of antenna ports and the second antenna ports may be such that one of the antenna ports in the first set are determined as a weighted sum of two or more antenna ports in the second set.

In some embodiments, the network may assign different energy levels to different resource elements in the time/frequency grid, which also includes the different reference signals. In some embodiments, to facilitate accurate channel estimation, gain differences between CRS and DMRS symbols may be reflected by the magnitude of the weights that are signaled or inferred. In some embodiments the gain differences between CRS and DMRS symbols may be signaled separately. In some embodiments, the gain difference between CRS and DMRS symbols may be estimated in the wireless device.

In some embodiments, a wireless device may discard amplitude information obtained from the CRS ports. The wireless device may estimate the amplitude from the DMRS symbols and estimate the phase from both the DMRS and the CRS symbols. In some embodiments, a wireless device may weigh the channel estimates obtained from CRS ports and DMRS ports differently (e.g., according to a minimum mean-square error (MMSE) criterion) based on signal strengths, interference levels, signal-to-noise-and-interference ratio, or some other reliability measure of the received reference symbols.

In some embodiments, the weights may be deduced from measurements in a wireless device that estimate a desired set of weights to, for example, maximize a beam-forming or spatial multiplexing gain. The wireless device may then, directly or indirectly, signal the desired set of weights to the radio network node. The radio network node may use the signaled weights from a predetermined point in time known to both the radio network node and the wireless device. This method may be similar to the way precoders are selected in multi-antenna transmission modes, with the addition that this method may be used for the DMRS (and data). Additionally, both the CRS and the DMRS may be used for channel estimation because the relation between the CRS and the DMRS is known.

In some embodiments, the radio network node may also determine and communicate one or more conditions that specify when the antenna port mapping applies. For example, the mapping may apply for certain control messages sent to wireless devices in need of coverage enhancement, otherwise no mapping may be assumed.

A mapping may, for example, apply to one or more downlink control information (DCI) formats used on EPDCCH together with repetition for coverage enhancement, and for other DCI formats the UE may not assume any specific mapping between the first and second set of antenna ports. Other conditions may require that a UE is operating in a specific mode, such as a coverage enhancement mode.

Some embodiments may include timing conditions for when the mapping applies. For example, a mapping may be valid until explicitly signaled to be invalid, or a mapping may be valid for a limited time. As another example, the mapping may be valid for the next N (where N≥1) EPDCCH transmissions, which may or may not be repeated over more than one subframe. Conditions may be signaled explicitly, or may be inferred implicitly (e.g., based on a standard).

In some embodiments, a first set of antenna ports in a first subframe may be mapped to a second set of antenna ports in a second subframe, different from the first subframe. For example, the DMRS for PDSCH (e.g., any of antenna ports p∈{7 . . . 10}) may be mapped to the DMRS for EPDCCH (e.g., any of antenna ports p∈{107 . . . 110}) in earlier subframes. This mapping may be used to achieve good initial channel estimates for a PDSCH transmission that follows directly after an EPDCCH transmission on resource blocks occupying (at least partially) the same frequencies.

In some embodiments, the number of CRS ports used may be (semi-) static and may be part of the system information that a wireless device receives when first connecting to a cell. The number of DMRS ports, however, may be dynamic and may be determined based on a current feasibility for beam-forming or spatial multiplexing, which may in turn be decided based on, for example, current throughput needs and characteristics of the propagation channel.

If the number of DMRS ports used at a specific time is less than the number of CRS ports, the DMRS ports may be determined from some or all of the CRS ports according to any of the previous embodiments. If the number of DMRS ports used at a specific time is larger than the number of CRS ports, a first set of DMRS ports may be mapped to the CRS ports while the remaining DMRS ports may not be mapped to a reference signal. In some embodiments, the remaining RS may be mapped to another RS set, for example CSI-RS or MBSFN RS.

In some embodiments, the mapping between the DMRS and the CRS associated with transmission to a first wireless device may be signaled to a second wireless device. The mapping information may be used, for example, by the second wireless device to perform channel estimation during periods when no data traffic is assigned to the second wireless device. This may be advantageous when a certain frequency region is allocated to wireless devices in enhanced coverage mode.

Modifications, additions, or omissions may be made to method 500. Additionally, steps of method 500 may be performed in any suitable order and/or repeated as needed.

Figure 6:
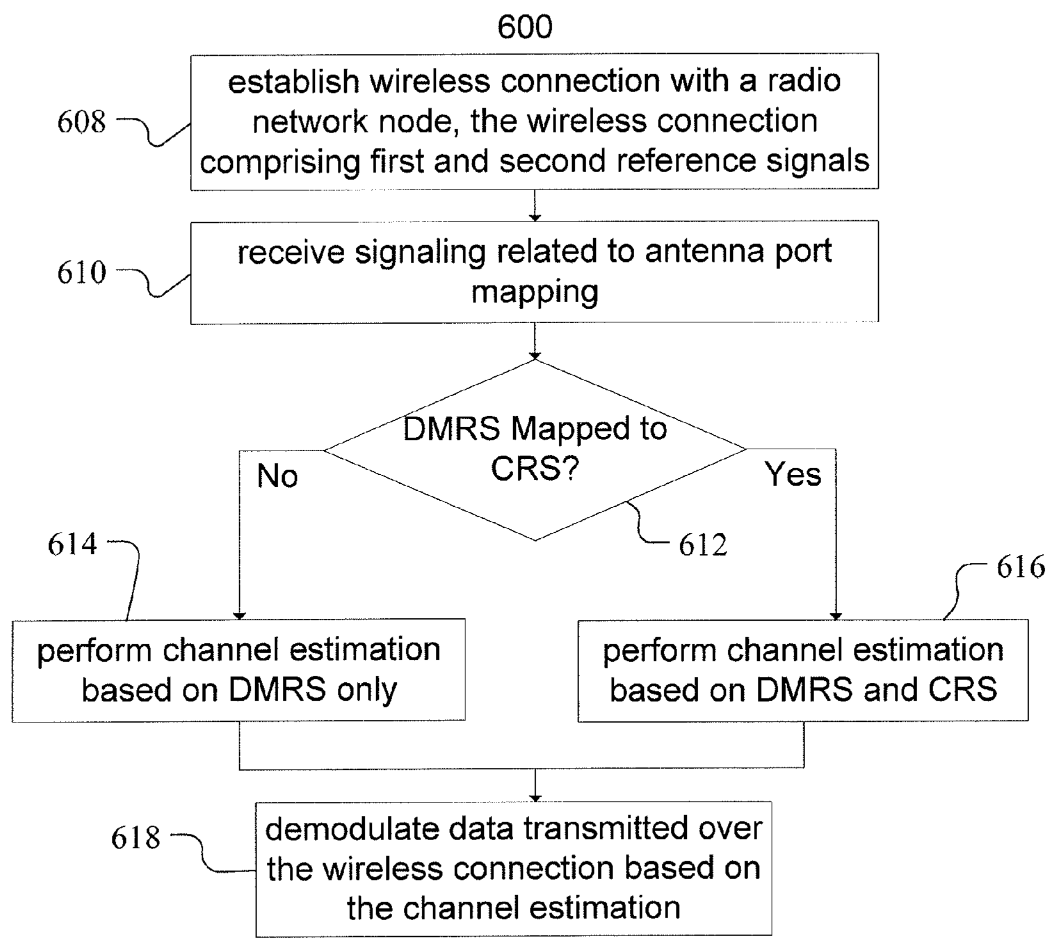
FIG. 6 is a flowchart of an example method of coupling reference signals in a wireless device, according to some embodiments.

FIG. 6 is a flowchart depicting an embodiment of a method performed in a wireless device. In particular embodiments, one or more steps of method 600 may be performed by components of network 100 described with reference to FIGS. 1-4B and 7-8.

Method 600 begins at step 608, where a wireless device, such as wireless device 110 in FIG. 1, establishes a wireless connection, such as wireless connection 130, with a radio network node, such as radio network node 120. The wireless connection comprises at least two reference signals. As a particular example, wireless device 110 may comprise three reference signals 135*a*-*c*. Reference signal 135*a* may comprise CRS 135*a* and may be associated with antenna ports p=0 and p=1. Reference signal 135*b* may comprise DMRS 135*b* and may be associated with antenna ports p=7 and p=8.

At step 610, a wireless device, such as wireless device 110, receives a mapping between one or more antenna ports associated with a first reference signal and one or more antenna ports associated with a second reference signal. The mapping and the receiving the mapping may be performed according to any of the various embodiments and examples described above with reference to method 500 of FIG. 5. For example, wireless device 110 may receive a mapping indicating a one-to-one relationship between antenna ports of DMRS 135*b* and CRS 135*a*.

At step 612, wireless device 110 determines whether the received signaling maps a first reference signal to a second reference signal. If the received signaling does not map a first reference signal (e.g., DMRS) to a second reference signal (e.g., CRS), then wireless device 110, at step 614, performs channel estimation based on the first reference signal (e.g., DMRS) only.

If the received signaling does map a first reference signal (e.g., DMRS) to a second reference signal (e.g., CRS), then wireless device 110, at step 316, performs channel estimation based on at least the first reference signal, the second reference signal, and the received antenna port mapping. For example, because wireless device 110 knows the one-to-one mapping between DMRS 135*b* and CRS 135*a*, wireless device 110 may treat DMRS 135*b* and CRS 135*a* as a combined reference signal and perform channel estimation based on the combined DMRS/CRS reference signal.

At step 618, wireless device 110 demodulates received data based on the channel estimation. Modifications, additions, or omissions may be made to method 600. Additionally, steps of method 600 may be performed in any suitable order and/or repeated as needed.

Figure 7:
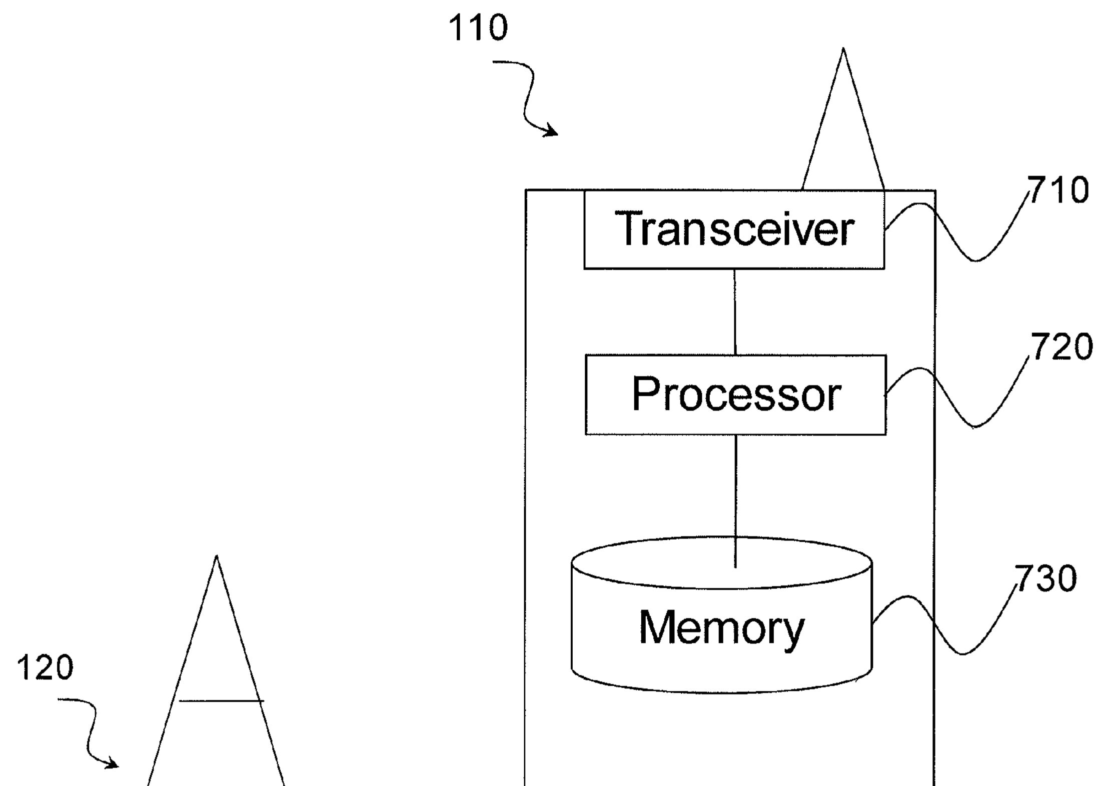
FIG. 7 is a block diagram illustrating an example embodiment of a wireless device.

FIG. 7 is a block diagram illustrating an example embodiment of a wireless device. The wireless device is an example of wireless device 110 illustrated in FIG. 1. Particular examples include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, or any other device that can provide wireless communication. The wireless device includes transceiver 710, processor 720, and memory 730. In some embodiments, transceiver 710 facilitates transmitting wireless signals to and receiving wireless signals from wireless radio network node 120 (e.g., via an antenna), processor 720 executes instructions to provide some or all of the functionality described herein as provided by the wireless device, and memory 730 stores the instructions executed by processor 720.

Processor 720 includes any suitable combination of hardware and software implemented in one or more integrated circuits or modules to execute instructions and manipulate data to perform some or all of the described functions of the wireless device. In some embodiments, processor 720 may include, for example, one or more computers, one more programmable logic devices, one or more central processing units (CPUs), one or more microprocessors, one or more applications, and/or other logic, and/or any suitable combination of the preceding. Processor 720 may include analog and/or digital circuitry configured to perform some or all of the described functions of wireless device 110. For example, processor 720 may include resistors, capacitors, inductors, transistors, diodes, and/or any other suitable circuit components.

Memory 730 is generally operable to store computer executable code and data. Examples of memory 730 include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or or any other volatile or non-volatile, non-transitory computer-readable and/or computer-executable memory devices that store information.

In particular embodiments, processor 720 in communication with transceiver 710 receives reference signals from radio network node 120. Processor 720 may perform channel estimation and data demodulation. Other embodiments of the wireless device may include additional components (beyond those shown in FIG. 7) responsible for providing certain aspects of the wireless device's functionality, including any of the functionality described above and/or any additional functionality (including any functionality necessary to support the solution described above).

In particular embodiments, wireless device 110 may include a channel estimation module and a communication module. The channel estimation module may perform the processing functions of wireless device 110 related to performing channel estimation based on a combination of two or more reference signals. For example, the channel estimation module may perform channel estimation based on a combined DMRS/CRS signal. In certain embodiments, the channel estimation module may include or be included in processor 720. The channel estimation module may include analog and/or digital circuitry configured to perform any of the functions of the channel estimation module and/or processor 720.

The communication module may perform the transmit and receive functions of wireless device 110. For example, the communication module may receive information about a mapping of two or more reference signals from radio network node 120 or other wireless devices 110. As another example, the communication module may transmit messages to radio network node 120 of network 100. The communication module may also receive reference signals transmitted from radio network node 120. For example, the communication module may receive DMRS and CRS from radio network node 120. In certain embodiments, the communication module may include or be included in transceiver 710. The communication module may include a transmitter and/or a transceiver. In certain embodiments, the communication module may include or be included in processor 720. The communication module may include circuitry configured to wirelessly transmit messages and/or signals. In particular embodiments, the communication module may receive messages and/or signals for transmission to/from the channel estimation module.

Figure 8:
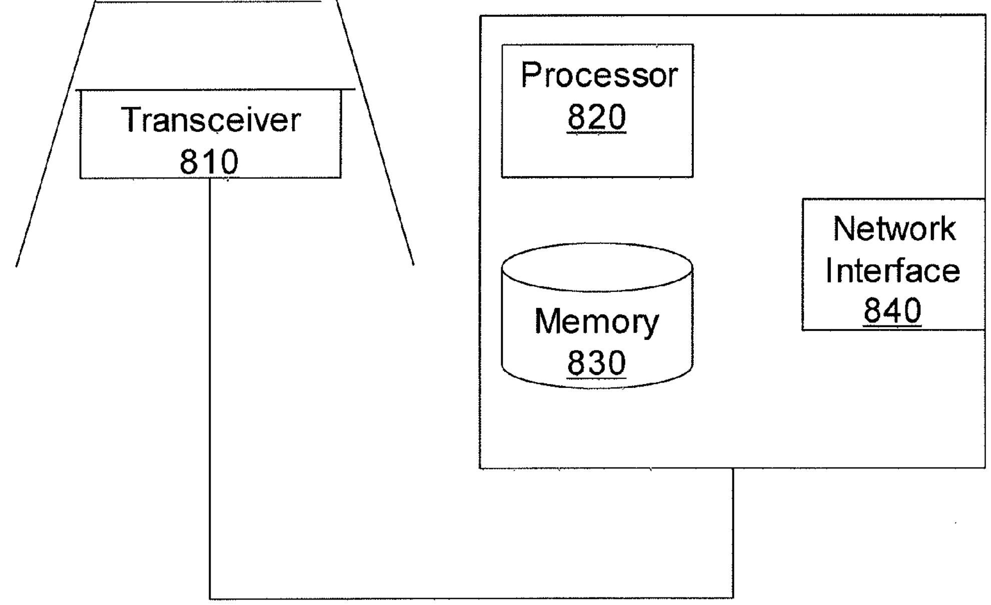
FIG. 8 is a block diagram illustrating an example embodiment of a radio network node.

FIG. 8 is a block diagram illustrating an example embodiment of a network node. Radio network node 120 can be an eNodeB, a nodeB, a base station, a wireless access point (e.g., a Wi-Fi access point), a low power node, a base transceiver station (BTS), a transmission point or node, a remote RF unit (RRU), a remote radio head (RRH), or other radio access node. Radio network node 120 includes at least one transceiver 810, at least one processor 820, at least one memory 830, and at least one network interface 840. Transceiver 810 facilitates transmitting wireless signals to and receiving wireless signals from a wireless device, such as wireless devices 110 (e.g., via an antenna); processor 820 executes instructions to provide some or all of the functionality described above as being provided by a radio network node 120; memory 830 stores the instructions executed by processor 820; and network interface 840 communicates signals to backend network components, such as a gateway, switch, router, Internet, Public Switched Telephone Network (PSTN), controller, and/or other network nodes 120. Processor 820 and memory 830 can be of the same types as described with respect to processor 720 and memory 730 of FIG. 7 above.

In some embodiments, network interface 840 is communicatively coupled to processor 820 and refers to any suitable device operable to receive input for radio network node 120, send output from radio network node 120, perform suitable processing of the input or output or both, communicate to other devices, or any combination of the preceding. Network interface 840 includes appropriate hardware (e.g., port, modem, network interface card, etc.) and software, including protocol conversion and data processing capabilities, to communicate through a network.

In particular embodiments, processor 820 in communication with transceiver 810 transmits, to wireless device 110, control information. The control information may specify a relationship or mapping between reference signals. In particular embodiments, processor 820 in communication with transceiver 810 transmits reference signals, as described above, to wireless device 110.

Other embodiments of radio network node 120 include additional components (beyond those shown in FIG. 8) responsible for providing certain aspects of the network node's functionality, including any of the functionality described above and/or any additional functionality (including any functionality necessary to support the solution described above). The various different types of radio network nodes may include components having the same physical hardware but configured (e.g., via programming) to support different radio access technologies, or may represent partly or entirely different physical components.

In particular embodiments, radio network node 120 may include a determining module and a communication module. The determining module may perform the processing functions of radio network node 120 related to determining a mapping between antenna ports of a first reference signal and antenna ports of a second reference signal. For example, the determining module may determine a mapping between antenna ports of a DMRS and a CRS. In particular embodiments, determining the mapping may include applying weights to antenna ports associated with one of the reference signals. In certain embodiments, the determining module may include or be included in processor 820. The determining module may include analog and/or digital circuitry configured to perform any of the functions of the determining module and/or processor 820.

The communication module may perform the transmit and receive functions of radio network node 120. For example, the communication module may communicate information determined by the determining module to wireless devices 110 or another radio network node 120. For example, the communication module may transmit information about a mapping of two or more reference signals to wireless devices 110. As another example, the communication module may transmit reference signals (e.g., DMRS, CRS, etc.) to wireless devices 110 of network 100. In certain embodiments, the communication module may include or be included in transceiver 810. The communication module may include a transmitter and/or a transceiver. In certain embodiments, the communication module may include or be included in processor 820. The communication module may include circuitry configured to wirelessly transmit messages and/or signals. In particular embodiments, the communication module may receive messages and/or signals for transmission to/from the determining module.

Some embodiments of the disclosure may provide one or more technical advantages. As an example, in some embodiments, the methods and apparatus disclosed herein may facilitate performing channel estimation and data demodulation in a low SINR environment. Channel estimation and data demodulation may be performed more efficiently to improve overall system performance.

Some embodiments may benefit from some, none, or all of these advantages. Other technical advantages may be readily ascertained by one of ordinary skill in the art.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the claims below.

Abbreviations Used in the Preceding Description May Include:

ACK Acknowledged
BTS Base Transceiver Station
CFI Control Format Indicator
CSI-RS Channel State Information Reference Signal
DCI Downlink Control Information
DFT Discrete Fourier Transform
DMRS DeModulation Reference Signal
eNB eNodeB
EPDCCH Enhance Physical Downlink Control Channel
FDD Frequency Division Duplex
GSM Global System for Mobile communications
HD-FDD Half Duplex FDD
LTE Long Term Evolution
M2M Machine to Machine
MBSFN Multi-Broadcast Single-Frequency Network
MIMO Multiple-Input Multiple-Output
MMSE Minimum Mean-Square Error
NACK Not Acknowledged
OFDM Orthogonal Frequency Division Multiplexing
PDCCH Physical Downlink Control Channel
PDSCH Physical Downlink Shared Channel
PRB Physical Resource Block
RB Resource Block
RF Radio Frequency
RRC Radio Resource Control
RRH Remote Radio Head
RRU Remote Radio Unit
RS Reference Signal
Rx Receiver
SC-FDMA Single-Carrier Frequency Division Multiple Access
SNR Signal to Noise Ratio
SINR Signal to Interference and Noise Ratio
TDD Time Division Duplex
Tx Transmitter
UE User Equipment
UMTS Universal Mobile Telecommunications Service
VRB Virtual Resource Block

The invention claimed is:

1. A method of coupling reference signals of a wireless network, the method comprising:

establishing a wireless connection with a radio network node, wherein the wireless connection comprises a first reference signal and a second reference signal and both the first and second reference signals are associated with one or more antenna ports;

receiving a mapping between the one or more antenna ports associated with the first reference signal and the one or more antenna ports associated with the second reference signal;

performing channel estimation based at least on one of the first reference signal, the second reference signal, and the received mapping of antenna ports, wherein performing channel estimation comprises:

estimating an amplitude component of the channel based on estimating amplitude information obtained from the first reference signal and discarding amplitude information obtained from the second reference signal; and estimating a phase component of the channel based on both the first reference signal and the second reference signal; and demodulating data transmitted over wireless connection based on the channel estimation.

2. The method of claim 1, wherein performing channel estimation is based on the first reference signal, the second reference signal, and the received mapping of antenna ports.

3. The method of claim 1, wherein the first reference signal comprises a demodulation reference signal, DMRS, and the second reference signal comprises a cell-specific reference signal, CRS.

4. The method of claim 1, wherein the mapping of antenna ports comprises a precoding weight associated with one or more of the antenna ports associated with the first reference signal.

5. The method of claim 4, wherein the precoding weights are based on a gain difference between the first reference signal and the second reference signal.

6. The method of claim 1, further comprising:

estimating a desired set of weights for each of the antenna ports associated with the first reference signal; and communicating the desired set of weights to the network node.

7. The method of claim 1, wherein the mapping of antenna ports comprises at least one antenna port associated with the first reference signal mapped to at least two antenna ports associated with the second reference signal.

8. The method of claim 1, wherein:

the mapping of antenna ports comprises at least one antenna port associated with the first reference signal and a first subframe; and the at least one antenna port associated with the first reference signal is mapped to at least one antenna port associated with the second reference signal and a second subframe.

9. A wireless device for coupling reference signals of a wireless network, comprising:

a processor operable to establish a wireless connection with a radio network node, wherein the wireless connection comprises a first reference signal and a second reference signal and both the first and second reference signals are associated with one or more antenna ports;

an interface operable to receive a mapping between the one or more antenna ports associated with the first reference signal and the one or more antenna ports associated with the second reference signal;

the processor further operable to perform channel estimation based at least on one of the first reference signal, the second reference signal, and the received mapping of antenna ports, wherein the processor operable to perform the channel estimation is operable to:

estimate an amplitude component of the channel based on estimating amplitude information obtained from the first reference signal and discarding amplitude information obtained from the second reference signal; and estimate a phase component of the channel based on both the first reference signal and the second reference signal; and demodulate data transmitted over wireless connection based on the channel estimation.

10. The wireless device of claim 9, wherein the processor is operable to perform channel estimation based at least on the first reference signal, the second reference signal, and the received mapping of antenna ports.

11. The wireless device of claim 9, wherein the first reference signal comprises a demodulation reference signal, DMRS, and the second reference signal comprises a cell-specific reference signal, CRS.

12. The wireless device of claim 9, wherein the mapping of antenna ports comprises a precoding weight associated with one or more of the antenna ports associated with the first reference signal.

13. The wireless device of claim 12, wherein the precoding weights are based on a gain difference between the first reference signal and the second reference signal.

14. The wireless device of claim 12, wherein:

the processor is operable to estimate a desired set of weights for each of the antenna ports associated with the first reference signal; and the interface is operable to communicate the desired set of weights to the network node.

15. The wireless device of claim 9, wherein the mapping of antenna ports comprises at least one antenna port associated with the first reference signal mapped to at least two antenna ports associated with the second reference signal.

16. The wireless device of claim 9, wherein:

the mapping of antenna ports comprises at least one antenna port associated with the first reference signal and a first subframe; and the at least one antenna port associated with the first reference signal is mapped to at least one antenna port associated with the second reference signal and a second subframe.

* * * * *